United States Patent [19]
Giovannone

[11] Patent Number: 5,600,939
[45] Date of Patent: Feb. 11, 1997

[54] SYSTEM FOR MAKING PLASTIC BLISTER PACKAGES

[75] Inventor: Anthony Giovannone, Osterville, Mass.

[73] Assignee: Sencorp Systems, Inc., Hyannis, Mass.

[21] Appl. No.: 454,843

[22] Filed: May 31, 1995

Related U.S. Application Data

[62] Division of Ser. No. 399,088, Mar. 8, 1995, Pat. No. 5,522,505, which is a division of Ser. No. 285,659, Aug. 3, 1994, Pat. No. 5,404,693, which is a continuation of Ser. No. 870,405, Apr. 17, 1992, abandoned.

[51] Int. Cl.$^6$ .............................. B65B 47/02; B65B 47/10
[52] U.S. Cl. ............................................. 53/559; 53/374.5
[58] Field of Search .................... 53/559, 374.5, 53/453, 477, 478; 206/462, 461, 471; 428/46

[56] References Cited

U.S. PATENT DOCUMENTS

| | | | |
|---|---|---|---|
| 3,195,284 | 7/1965 | Crane, Jr. | 53/559 X |
| 3,497,059 | 2/1970 | Watts, Jr. | 53/453 X |
| 3,657,857 | 4/1972 | DeWoskin et al. | 53/559 X |
| 3,660,962 | 5/1972 | Bliss et al. | 53/559 X |
| 3,788,032 | 1/1974 | Heffernan et al. | 53/559 X |
| 3,920,371 | 11/1975 | Faller | 53/559 X |
| 3,946,537 | 3/1976 | Hair et al. | 53/559 |
| 5,054,271 | 10/1991 | DeWoskin | 53/559 |

*Primary Examiner*—James F. Coan
*Attorney, Agent, or Firm*—Richard P. Crowley

[57] ABSTRACT

Apparatus and method for the packaging of an article in a plastic-card package which includes a flat card having a window aperture cut therein fed to the apparatus, and a flat, thermoformable plastic sheet, cut-to-size larger than the aperture and smaller than the face of the card and positioned to cover the aperture. The perimeter of the sheet is heat tacked by an adhesive to the card at a plurality of points around the perimeter of the aperture, and the thermoformable material is heated to form a blister in the sheet and to heat seal the edges of the formed blister to the card. The blister is filled, and the filled blister is covered with a backing cover sheet, and the card sealed to form a package.

16 Claims, 1 Drawing Sheet

SYSTEM FOR MAKING PLASTIC BLISTER PACKAGES

REFERENCE TO PRIOR APPLICATIONS

This application is a divisional application of U.S. Ser. No. 08/399,088, filed Mar. 8, 1995, now U.S. Pat. No. 5,522,505, which is a divisional application of U.S. Ser. No. 08/285,659, filed Aug. 3, 1994, now U.S. Pat. No. 5,404,693, issued Apr. 11, 1995, which application was a continuation application of U.S. Ser. No. 07/870,405, filed Apr. 17, 1992, now abandoned.

FIELD OF THE INVENTION

The invention relates to a form/fill/seal apparatus and method for making plastic, blister card packages.

BACKGROUND OF THE INVENTION

There are many known plastic, blister-type package apparatus, such as form/fill/seal machines, in which the initial feed material for the machine is a flat card having a window covered with thermoformable film, the film having been applied to the card off-line. Patents showing such an arrangement include U.S. Pat. Nos. 3,053,023, 3,075,330 and 3,997,052. In other apparatus, the plastic blisters are separately thermoformed, and each formed blister is transferred to a card to which it is sealed prior to filling and closing. Such a system is described in U.S. Pat. No. 2,970,414 to Rohdin. In an apparatus described in U.S. Pat. Nos. 3,221,473 and 3,232,024, a thermoformable sheet, smaller than the card which will form the face of the package and larger than the aperture in which the blister will be made is applied to a card off-line. The already-windowed card is fed to a package-forming machine and shrink-type package is produced. In U.S. Pat. No. 3,657,857, fixed apparatus is used to apply shrink film to a card from a roll, and the film is severed from the roll of film after sealing to the card.

It is desirable to provide a new and improved plastic, blister card package apparatus, system and method of blister packaging which overcomes the disadvantages of prior art and which apparatus may be portable and used at the output end of a plastic injection apparatus.

SUMMARY OF THE INVENTION

The present invention concerns a plastic, blister card apparatus, system and method of packaging.

The blister card package apparatus of the invention comprises in combination means to feed a flat card having a defined window aperture cut therein into the apparatus; means to feed a thermoformable plastic sheet to a defined position covering the said aperture in the fed card with the card serving as a carrier for the plastic sheet; means to tack such as by a heat or heat tackable adhesive material the thermoformable sheet to one or more points about the perimeter of the aperture to hold the thermoformable sheet in place; means to heat the thermoformable material in the aperture and to form a blister of defined shape; means to fill the formed blister with an object to be packaged; means to cover the back of the aperture with a back cover sheet; and means to heat seal the thermoplastic cover to the card and the back sheet and about the perimeter of the aperture by the application of heat and pressure.

The method of the invention comprises feeding a windowed, flat card for forming a blister package having a defined aperture therein to a defined position; feeding and positioning a cut-to-size, e.g. flat, sheet of thermoformable material to cover the said aperture using the windowed card as a carrier and heat-tacking the thermoformable material to the card at one or more points about the perimeter of the aperture of the card to hold the thermoformable material in position for thermoforming and heat sealing operations. The flat card with the tacked, thermoformable, flat sheet material covering the window may be used immediately or stored and/or shipped to separate locations for subsequent processing. The method includes heating the thermoformable plastic sheet over the aperture, such as by the use of a heated contact die or radiant heat and air, forming a blister, such as of transparent plastic, for example, but not limited to, polyvinyl chloride, of defined shape and at the same time, sealing the transparent plastic to the card about the periphery of the aperture, filling the formed blister with an object to be packaged, placing a back cover over the aperture and sealing the card and back cover by the application of heat and pressure to complete the package.

A packaging apparatus is described for on-line forming, filling and sealing packages. A flat card having an aperture cut therein is fed to the apparatus, and a thermoformable sheet, cut-to-size larger, e.g. slightly larger, than the aperture and smaller than the face of the card is positioned covering the aperture. The perimeter of the sheet is heat-tacked by an adhesive (or heat sealed without an adhesive) to the card at one or preferably a plurality of points, for example, equally spaced, around the perimeter of the aperture and spaced inwardly slightly on the back of the card to hold the thermoplastic material for the forming and sealing step. The thermoformable material is preheated and a blister is thermoformed in the plastic sheet. The rigid, formed blister is filled with the object to be packaged, the filled blister is covered with a backing sheet which may be a separate card, paper backing sheet, a metal foil or a cover sheet foldably attached to the card, and the card sealed under heat and pressure to form a complete package and then removing or stacking the complete package for shipment or use.

The apparatus is compact and may be portable for readily moving from place to place, as required. The apparatus may be used at or near the output end of an injection molding machine, so that molded articles are immediately packaged without any temporary stacking, transporting or storage being necessary, and then moved to receive articles from another machine at another time. The card is typically a flat card of board or paper stock. The card and aperture therein may vary in size and shape, but generally both are rectangular with the card having printed or graphic material on the face surface with the back surface generally plain and coated with an adhesive for sealing. The thickness of the card and thermoformable material may also vary, but generally the thermoformable material has a thickness of about 6 to 24 mils, e.g. 10 to 15 mils. The thermoformable material comprises a heat-formable plastic, generally translucent or transparent, but which may be opaque, and usually forms a rigid blister on the card. The thermoformable material may comprise, but is not limited to: polyvinyl chloride or copolymer of vinyl chloride; polystyrene or oriented polystyrene; polyethylene terphthalate; and copolymers thereof, and other thermoplastic polymers. One object of the invention is to provide a portable form/fill/seal apparatus for making packages. Another object of the invention is to provide a method of making blister packages on a portable form/fill/seal machine in which the blister material is tacked around an aperture in a card before sealing the material to the card and forming the blister.

The invention includes a flat sheet card material, such as a flat cardboard sheet material typically printed with trademark, designs, instructions, etc., for the article to be packaged and which has one or more window aperture areas in the flat sheet wherein a blister can be formed. The flat sheet material includes a flat sheet of thermoformable sheet material secured, such as by heat or adhesives or both, is heat tacked to the flat sheet card material and over the window aperture. The flat sheet card material is prepared, is easily stored and shipped to the place of use, that is, where the flat, thermoformable, secured sheet material can be heated and blister formed and filled and sealed. Thus, the flat sheet card material is adapted to be used in a blister packaging apparatus and method or can be formed in situ or separately shipped to the site for use. The employment of the flat sheet and material permits the pacing of the blister forming and filling apparatus to the article production and filling apparatus, since the blister forming, filling and sealing method can be stopped at any time.

The invention will be described for the purposes of illustration only in connection with certain embodiments; however, it is recognized that those persons skilled in the art may make various modifications, changes, improvements and additions to the preferred embodiments or illustrated embodiments, all without departing from the spirit and scope of the invention.

DETAILED DESCRIPTION OF THE INVENTION

Figure 1:
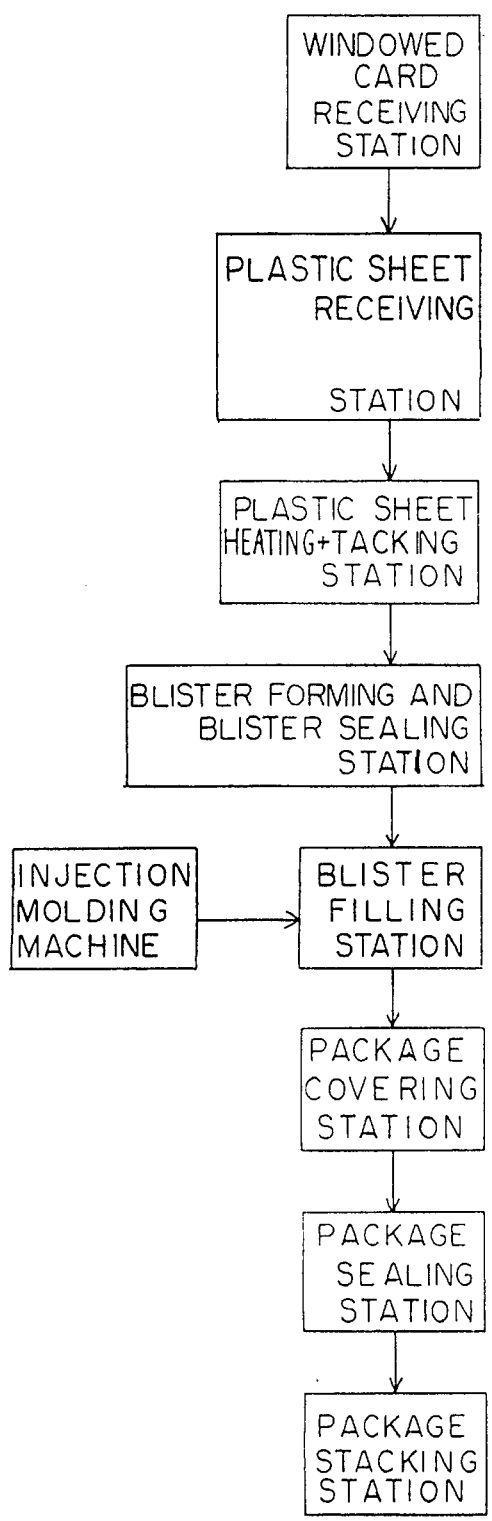
FIG. 1 is a schematic flow diagram of the different stations of the apparatus and system travelled by a card to be filled to form the blister package.
Figure 2:
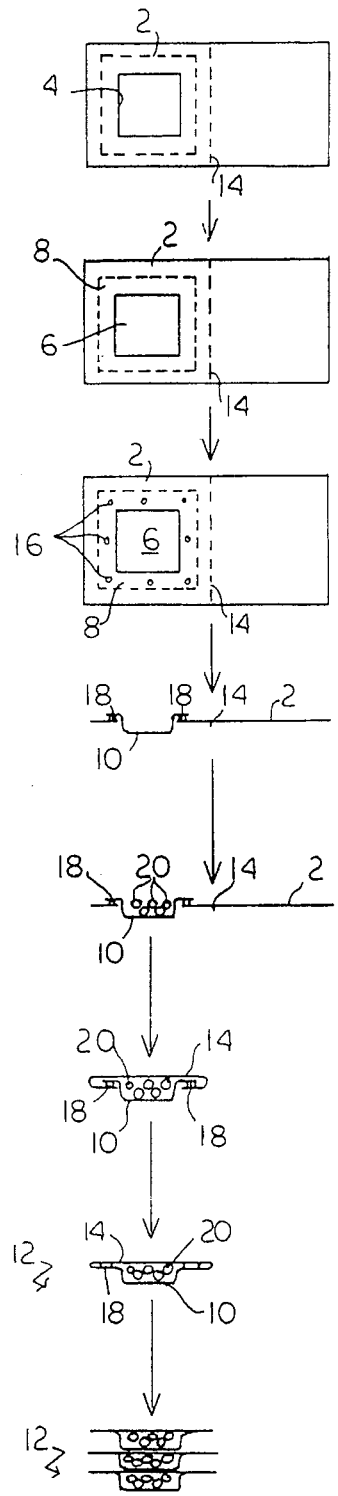
FIG. 2 is a schematic, illustrative view of the formation of the blister package formed by the apparatus used at each of the stations shown in FIG. 1.

The apparatus of the invention has many advantages for cost-saving packaging and facilitating efficient, on-line packaging without need to store goods to be packaged. The apparatus of the invention is compact, low cost and takes up little space in the factory. The apparatus, which may be portable, is positioned where it is needed, when it is needed, for example, at the output end of an injection molding machine producing articles to be packaged so that the finished articles are immediately packaged without storage. Moreover, the package formed is economical of blister material, since the blister material may be cut to size, smaller than the card used, without scrap, thus effecting savings in materials. While the blister may also be coextensive with the card, or coextensive with one-half of a card which is to be folded over the completing the package, a preferred embodiment is for the thermoformable sheet from which the blister is formed to be larger than an aperture cut in the card for receiving the blister, but smaller than the card itself, for reasons of economy.

According to the invention, as shown in the drawings the apparatus has a card receiving station as a first on-line station. A plain, flat, paper card 2 which may be scored in half or perforated along line 14 for folding to back cover the filled package is fed to the card receiving station. Card 2 has a window aperture 4 cut therein. The cards may be moved sequentially from station to station by a variety of means to include the use of a tray to carry the cards 2, the tray having apertures therein for the formation of the blister and having a plurality of upright pins to retain the card 2 in the desired position.

The apertured card 2 is fed to the next receiving and positioning station, at which a flat, thermoformable plastic sheet material 6, e.g. polyvinyl chloride, is cut to a size slightly larger than aperture 4 in the card, but preferably smaller than the card itself, is fed and positioned over aperture 4, using the card as the carrier. The perimeter portion 8 about ¼ inch of the thermoformable sheet material 6 is heat tacked adjacent the perimeter of aperture 4 at the plastic sheet tacking station. A tack anvil may be used to tack the thermoformable sheet over the aperture at a plurality of points 16 sufficient to hold the sheet in place for and during the blister material preheating step. The blister receiving, positioning and tacking stations may be at one location.

When the plastic sheet material is tacked in place, the card 2 is fed in a holding tray to the blister-forming station at which plastic sheet material 6 in the aperture 4 is preheated to a blister-forming temperature, for example, with a polyvinyl chloride sheet 6, a temperature of about 225° F. to 250° F. Simultaneously, the tacked area with tack points 16 is heat sealed preferably around the aperture 18 with the material 6. A rigid, transparent, see through blister 10 is formed, preferably downwards, by an opposing male or female die members and then cooled, as known in the art. The blister material 18 sealed around the aperture 4 forms a flange from the blister. In a preferred embodiment of the invention, the blister material is a known thermoformable sheet which forms a rigid blister, but shrinkable material or stretch pack material may also be thermoformed, and a depression to contain goods may be made therein, as known in the art.

Each blister 10 is then filled with at least one article 20 to be packaged at a blister filling station. The articles may be fed directly from the output end of an article-producing machine, such as an injection molding machine, or from the output of any machine which produces articles appropriately marketed in blister packs. There may be one or more than one filling station on-line depending on the relative speed of the apparatus of the invention and the speed of output of the apparatus delivering articles to be packaged.

At the package covering station, the card 2 is folded along line 14, or a separate backing card is fed to the machine to form a backing card for the package. The backing card may be heat or adhesive tacked in place if necessary, for example, by an adhesive coating on the surface 14 at the package sealing station. The filled package is then moved to the station at which the covering 14 is sealed to the article-filled 20, blister-containing card 2. The completed packages 12 are removed from the machine and stacked ready for distribution at the package stacking station.

Optionally, a foil, film, paper or other sheet material may be applied to cover the packaged article instead of, or in combination with, a backing card 14. A typical portable machine may, for example, be about six feet in length, as described, and if both a foil and card covering are used, the machine may be approximately one foot longer. A hot-air film shrinking station may be added if shrink wrap material is used in place of rigid blister material. The unloading of filled, sealed packages is accomplished, for example, by a pick-and-place mechanism which delivers the blister packs to a conveyor, as known to one skilled in the art.

The apparatus of the invention may equally be used for packaging articles manufactured at another time and/or place and stored before packaging. The blister material may be chosen for forming a rigid blister, a film blister or skin packaging.

The apparatus may include a self-contained vacuum pump and chiller units, so that connections to plant air and 115 volt electrical supply are the only connections necessary for operation. The machine is low in cost, economical to run, small in size and readily portable. The tooling for each station may be changed easily and inexpensively according to the packaging needed for different goods. The apparatus includes skids, wheels and/or casters for ease in moving and maneuvering the apparatus from place to place.

In the method, the flat, windowed card with the flat, plastic sheet tacked over the window may be easily stacked and stored for later use or transported to another location for the blister-forming and article-filling steps. The apparatus and method provide many advantages over the prior art method and apparatus for preparing blister-filled packages.

What is claimed is:

1. A system for preparing an article-containing blister package, which system comprises in combination:
   a) card-receiving means for feeding a flat card having a window aperture therein to a defined position;
   b) receiving and positioning means for feeding and positioning a cut-to-size, flat, plastic sheet of thermoformable material to cover said aperture of the positioned card;
   c) tacking means to tack said plastic sheet to the card and over and about the perimeter of the aperture to hold said sheet in place for subsequent processing;
   d) blister-forming means to heat said plastic sheet over the aperture and to form a blister therein to receive an article to be packaged;
   e) sealing means to seal the tacked plastic sheet to the card about the perimeter of the aperture under heat and pressure with the thermoformable material;
   f) blister-filling means to fill the formed blister with an article to be packaged;
   g) package-covering means to cover the back of the filled blister with a back cover sheet;
   h) package-sealing means to seal the back cover sheet to the card and to package the article within the blister.

2. The system of claim 1 wherein the tacking means heat tacks said sheet to the card at a plurality of tack points about and adjacent the perimeter of the aperture.

3. The system of claim 1 which includes a card having a portion to form a back cover and the package-covering means to fold over the card to form a back cover sheet.

4. The apparatus of claim 1 which includes a molding means to feed molded articles to be packaged into the formed blister at the blister-filling means.

5. The system of claim 1 wherein the flat card has at least one window aperture therein of a size to receive one or more articles to be blister packaged.

6. The system of claim 1 wherein the plastic sheet material is cut to a size and shape slightly larger that the window aperture and the tacking means heat-tacks said sheet at a plurality of generally uniformly spaced apart points about the periphery of the plastic sheet material to the card material.

7. The system of claim 1 wherein the window aperture of the card is positioned so that a non-window aperture section of the card material may be folded over along a fold line to form the back cover of the blister formed.

8. The system of claim 1 wherein the card material contains a folding line, so that a portion of the card material, on folding along the folding line, forms a back cover for the formed blister.

9. The system of claim 2 wherein the sealing means peripherally heat seals said plastic sheet over the tack points.

10. The system of claim 1 which includes means to move the card sequentially from means to means of said system.

11. The system of claim 10 wherein the means to move the cards includes a tray with apertures therein for the formation of the blister at the blister-forming means and includes a plurality of pins to retain the cards in position.

12. The system of claim 1 wherein the blister-forming means and the sealing means are at a single location and the blister forming and sealing steps are generally simultaneously carried out.

13. The system of claim 1 wherein the plastic sheet comprises a transparent vinyl chloride resin sheet to form a rigid see-through blister.

14. A system for preparing an article-containing blister package, which system comprises in combination:
   a) card-receiving means for feeding a flat card having a window aperture therein to a defined position wherein the card material contains a folding line, so that a portion of the card material, on folding along the folding line, forms a back cover for the formed blister;
   b) receiving and positioning means for feeding and positioning a cut-to-size, flat, plastic sheet of thermoformable material to cover said aperture of said positioned card;
   c) tacking means to heat tack said plastic sheet to said card at a plurality of tack points about and adjacent the perimeter of the aperture to hold said plastic sheet in place for subsequent processing;
   d) blister-forming means to heat said plastic sheet over the aperture and to form a blister therein to receive an article to be packaged;
   e) sealing means to heat seal the tacked plastic sheet to the card about the perimeter of the aperture under heat and pressure with the thermoformable material;
   f) blister-filling means to fill the formed blister with an article to be packaged;
   g) package-covering means to cover the back of the filled blister with a back cover sheet; and
   h) package-sealing means to seal the back cover sheet to the card and to package the article within the blister.

15. The system of claim 14 which includes means to move the card sequentially from means to means of said system.

16. The system of claim 14 wherein the blister-forming means and the sealing means are at a single location and the blister forming and sealing steps are generally simultaneously carried out.

* * * * *